(12) United States Patent
Han (10) Patent No.: US 9,337,468 B2
(45) Date of Patent: May 10, 2016

(54) SECONDARY BATTERY

(71) Applicant: SAMSUNG SDI CO., LTD., Yongin-si, Gyeonggi-do (KR)

(72) Inventor: Minyeol Han, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 171 days.

(21) Appl. No.: 14/167,948

(22) Filed: Jan. 29, 2014

(65) Prior Publication Data

US 2015/0099148 A1    Apr. 9, 2015

(30) Foreign Application Priority Data

Oct. 8, 2013  (KR) .................. 10-2013-0120142

(51) Int. Cl.
*H01M 2/34*    (2006.01)

(52) U.S. Cl.
CPC ........ *H01M 2/345* (2013.01); *H01M 2200/103* (2013.01); *H01M 2200/20* (2013.01)

(58) Field of Classification Search
CPC .................. H01M 2200/103; H01M 2200/20; H01M 2/345; H01M 2/12; H01M 2/0404; H01M 2/0473; H01M 2/0217; H01M 2/06
See application file for complete search history.

(56) References Cited

U.S. PATENT DOCUMENTS

| 2010/0279156 A1* | 11/2010 | Kim ..................... H01M 2/0404 429/56 |
| 2011/0183193 A1* | 7/2011 | Byun .................. H01M 2/0426 429/178 |
| 2012/0244580 A1 | 9/2012 | Hung et al. |

FOREIGN PATENT DOCUMENTS

| KR | 10-2011-0005197 A | 1/2011 |
| KR | 10-2011-0035805 A | 4/2011 |
| KR | 10-2011-0072721 A | 6/2011 |

* cited by examiner

*Primary Examiner* — Brittany Raymond
(74) *Attorney, Agent, or Firm* — Lewis Roca Rothgerber Christie LLP (57) ABSTRACT

Provided is a secondary battery including an electrode assembly, a case accommodating the electrode assembly, and a cap assembly, including a cap plate having a short-circuit hole, configured to seal the case. The secondary battery includes a first connection plate at an exterior surface of the case and coupled to the electrode assembly, a capacitive member between the first connection plate and the cap plate, and a short-circuit unit including an inversion plate positioned in the short-circuit hole, and a second connection plate at an exterior side surface of the case spaced apart from the cap plate and extending over at least a portion of the short-circuit hole, the second connection plate being coupled to the electrode assembly.

14 Claims, 5 Drawing Sheets

SECONDARY BATTERY

CROSS-REFERENCE TO RELATED APPLICATION

This application claims priority to and the benefit of Korean Patent Application No. 10-2013-0120142, filed in the Korean Intellectual Property Office on Oct. 8, 2013, the entire contents of which is incorporated herein by reference.

BACKGROUND

1. Field

Aspects of the present invention relate to a secondary battery.

2. Description of the Related Art

Generally, secondary batteries can be discharged and recharged, unlike primary batteries, which are not rechargeable. Secondary batteries may be of a low capacity type, which includes battery cells in the form of a pack typically used for small portable electronic devices such as cellular phones and camcorders, or a high capacity type, which includes battery cells used as a motor-driving power source and having several battery cells connected to one another and widely used as a power source for hybrid vehicles, etc.

Secondary batteries may be manufactured in various shapes, such as cylindrical shape or prismatic shapes. A typical secondary battery may include an electrode assembly having a positive plate and a negative plate with a separator acting as an insulator between the positive and negative plates accommodated in a battery case with an electrolyte, and a cap plate having electrode terminals coupled to the case.

When an internal pressure of a secondary battery rises due to excess heat generated by over-charging or decomposition of an electrolytic solution within the battery, a fire or explosion may occur within the secondary battery. Accordingly, it is necessary to manufacture a secondary battery having improved safety.

SUMMARY

Aspects of the present invention relate to a secondary battery, and more specifically to a secondary battery having a fuse part which can prevent an internal pressure of the secondary battery from excessively increasing by causing an internal short-circuit when the internal pressure rises above a threshold, and which can stabilize against a short circuit in the secondary battery caused by external factors.

Other aspects of the present invention relate to a secondary battery having a short-circuit plate and a connection plate that must first be melted before a fuse part can operate which can prolong a short-circuited state of the secondary battery and allow the fuse part to operate in a secured manner while a short-circuit current continues to flow.

In accordance with one aspect of the present invention, there is provided a secondary battery including an electrode assembly; a case accommodating the electrode assembly; a cap assembly including a cap plate having a short-circuit hole and configured to seal the case; a first connection plate at an exterior surface of the case and coupled to the electrode assembly; a capacitive member between the first connection plate and the cap plate; and a short-circuit unit including an inversion plate positioned in the short-circuit hole and a second connection plate at an exterior surface of the case spaced apart from the cap plate and extending over at least a portion of the short-circuit hole, the second connection plate being coupled to the electrode assembly.

The first connection plate and the cap plate may be insulated from the second connection plate.

In an embodiment, when an internal pressure of the case exceeds a preset pressure, the inversion plate may be configured to deform and contact the second connection plate.

The inversion plate may include a round convex portion adjacent to the electrode assembly; and a flange coupled to the cap plate.

The secondary battery may further include a first electrode terminal coupled to the electrode assembly and exposed to an exterior of the cap plate; and a second electrode terminal coupled to the electrode assembly and exposed to the exterior of the cap plate.

The secondary battery may further include a first collector plate configured to couple the electrode assembly to the first electrode terminal; and a second collector plate configured to couple the electrode assembly to the second electrode terminal.

The first collector plate may include a coupling part coupled to a first side of the electrode assembly, a bent part extending from a top of the coupling part, and an extension part extending from the bent part and coupled to the first electrode terminal.

The first collector plate may further include a fuse part on the extension part, the fuse part including a fuse hole and a fuse positioned in the fuse hole, the fuse having a smaller cross-sectional area than the extension part.

The capacitive member may include a low-capacity electrode assembly including a first electrode plate, a second electrode plate, and a separator between the first electrode plate and the second electrode plate, and a low-capacity case accommodating the low-capacity electrode assembly.

The first electrode plate, the separator, and the second electrode plate of the low capacity electrode assembly may be sequentially stacked.

The first electrode plate of the low-capacity electrode assembly may be coupled to the first connection plate, and the second electrode plate of the low-capacity electrode assembly may be coupled to the cap plate.

The low-capacity electrode assembly may be in a discharged state.

The low-capacity electrode assembly may be recharged by current generated when the inversion plate contacts the second connection plate.

In an embodiment, when the inversion plate contacts the second connection plate, the low-capacity electrode assembly may be configured to be recharged until the fuse is melted.

Additional aspects and/or advantages of the invention will be set forth in part in the description which follows and, in part, will be obvious from the description, or may be learned by practice of the invention or understood by those skilled in the art.

BRIEF DESCRIPTION OF THE DRAWINGS

The objects, features, and advantages of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can readily be manufactured and used by those skilled in the art.

As used herein, the term "and/or" includes any and all combinations of one or more of the associated listed items. In addition, the terminology used herein is for the purpose of describing particular embodiments only, and is not intended limit the scope of the invention. As used herein, singular forms are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various members, elements, regions, layers, and/or parts, these members, elements, regions, layers, and/or parts, are not limited by these terms. These terms are only used to distinguish one element from another member, element, region, layer, and/or part.

Figure 1:
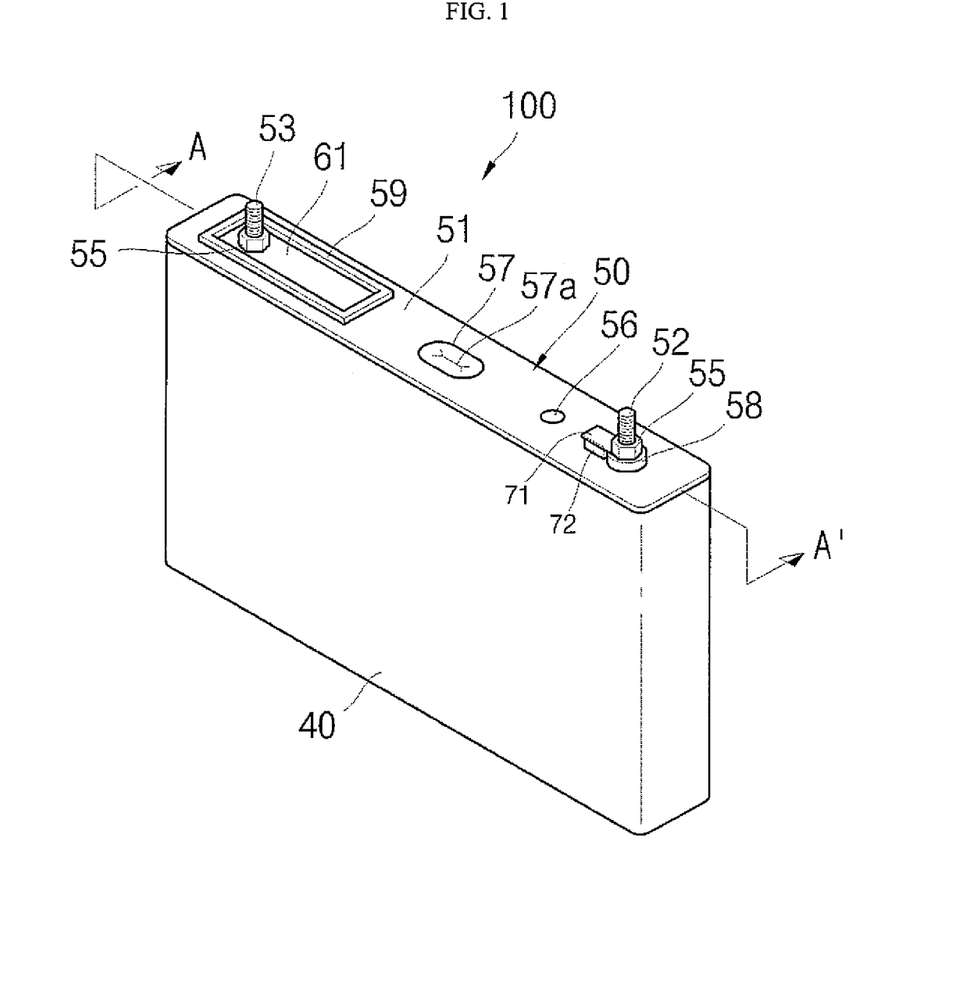
FIG. 1 illustrates a perspective view of a secondary battery according to an embodiment of the present invention.
Figure 2:
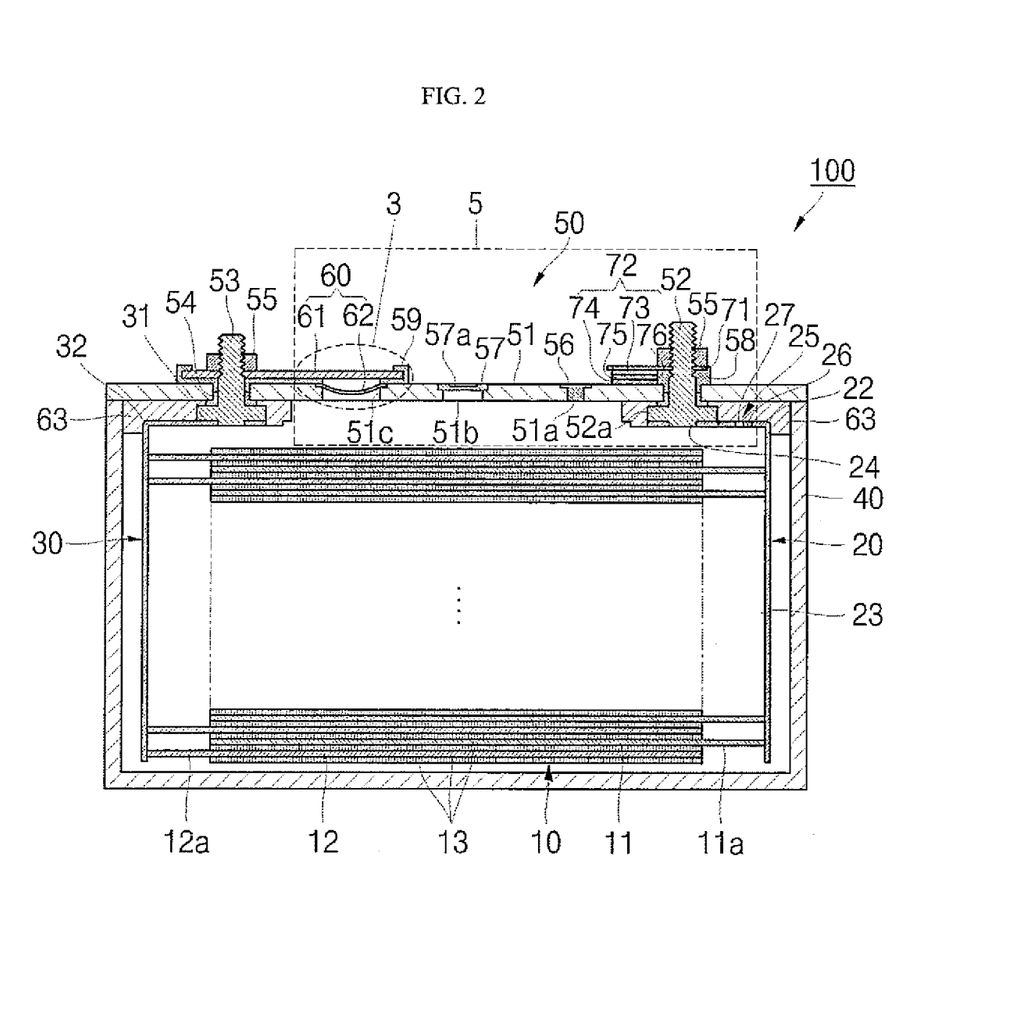
FIG. 2 illustrates a cross-sectional view of the secondary battery taken along line A-A' of FIG. 1.
Figure 3A:
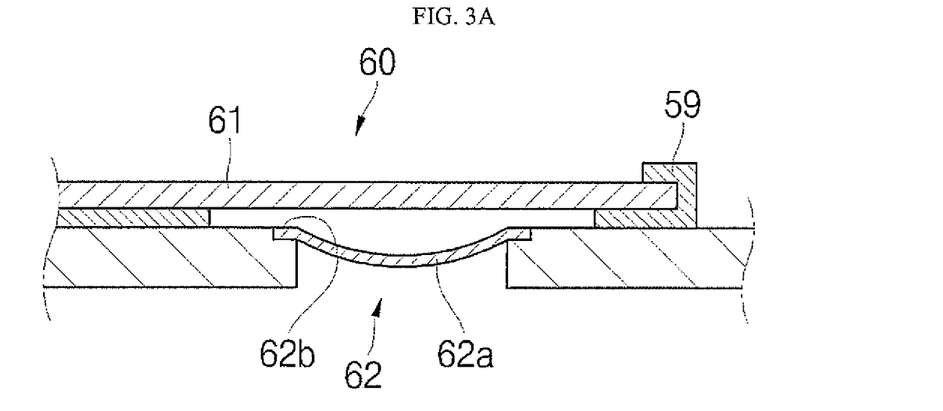
FIG. 3A illustrates an enlarged perspective view of a portion of the secondary battery shown in FIG. 2 and enclosed within reference numeral 3, depicting an inversion plate prior to inversion.
Figure 3B:
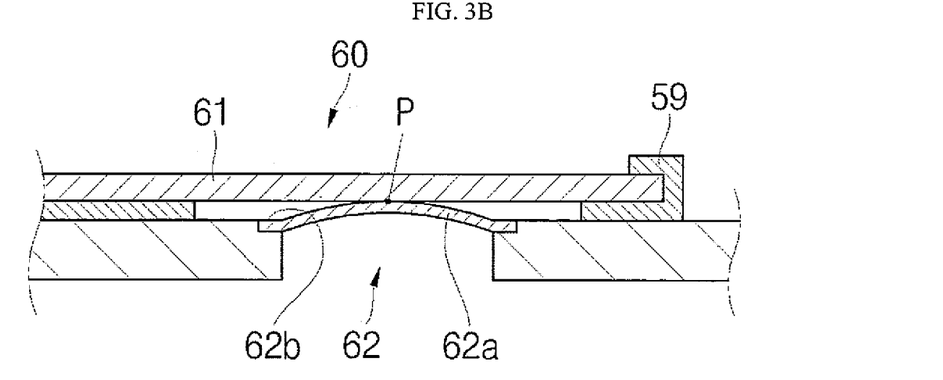
FIG. 3B illustrates the inversion plate shown in FIG. 3A after inversion.
Figure 4:
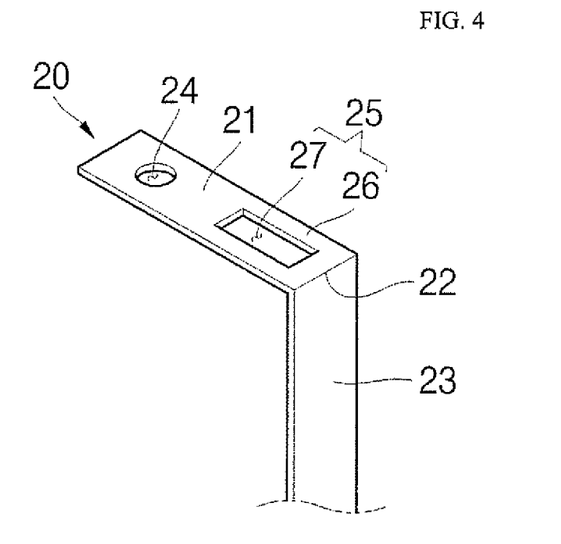
FIG. 4 illustrates an enlarged perspective view of a first current collector plate shown in FIG. 2.
Figure 5A:
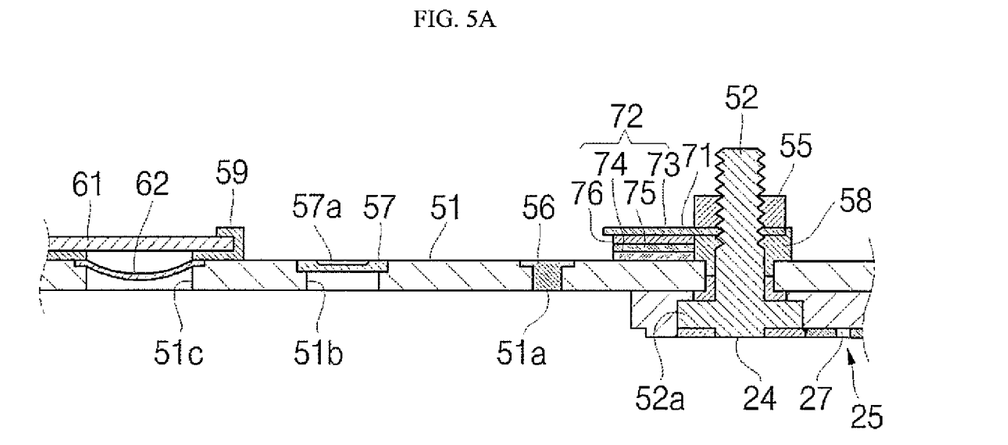
FIG. 5A illustrates an enlarged perspective view of a portion of the secondary battery shown in FIG. 2 and enclosed within reference numeral 5, depicting an inversion plate prior to inversion.
Figure 5B:
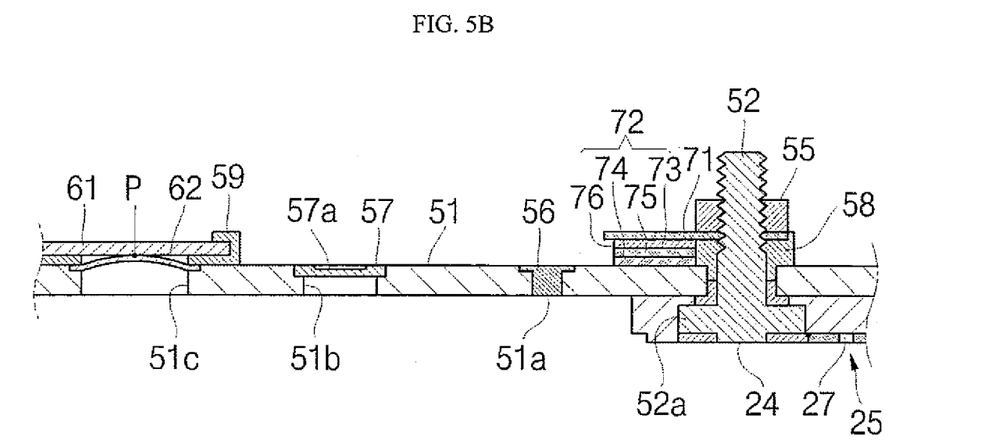
FIG. 5B illustrates the inversion plate shown in FIG. 5A after inversion.
Figure 6:
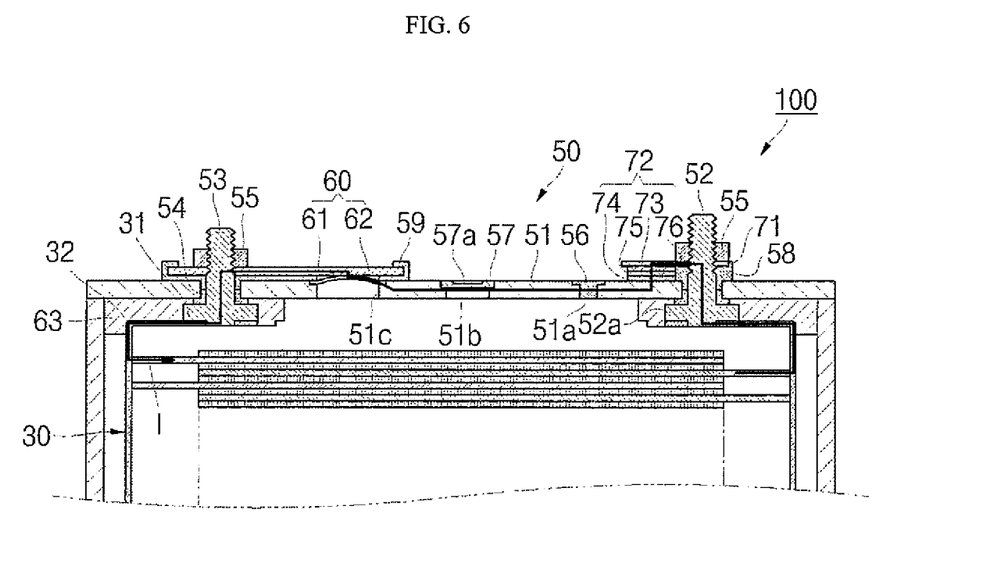
FIG. 6 illustrates a flow of short-circuit current after the inversion plate shown in FIG. 5A has been inverted to the position shown in FIG. 5B.

FIG. 1 illustrates a perspective view of a secondary battery according to an embodiment of the present invention, FIG. 2 illustrates a cross-sectional view of the secondary battery taken along line A-A' of FIG. 1. FIG. 3A illustrates an enlarged perspective view of a portion of the secondary battery shown in FIG. 2 and enclosed within reference numeral 3, depicting an inversion plate prior to inversion, and FIG. 3B illustrates the inversion plate shown in FIG. 3A after inversion. FIG. 4 illustrates an enlarged perspective view of a first current collector plate shown in FIG. 2. FIG. 5A illustrates an enlarged perspective view of a portion of the secondary battery shown in FIG. 2 and enclosed within reference numeral 5, depicting an inversion plate prior to inversion, and FIG. 5B illustrates the inversion plate shown in FIG. 5A after inversion. FIG. 6 illustrates a flow of short-circuit current after the inversion plate, shown in FIG. 5A, for example, ha been inverted to the position shown in FIG. 5B, for example.

First, referring to the embodiments shown in FIGS. 1 and 2, the secondary battery 100 according to an embodiment includes an electrode assembly 10, a first collector plate 20, a second collector plate 30, a case 40, a cap assembly 50, a short-circuit unit 60, a first connection plate 71, and a capacitive member 72.

The electrode assembly 10 according to this embodiment includes a wound or laminated stacked structure having a first electrode plate 11, a separator 13, and a second electrode plate 12, and, may be a thin plate or a thin foil shape. In this embodiment, the first electrode plate 11 may be a positive electrode and the second electrode plate 12 may be a negative electrode, but the present invention is not limited to this embodiment.

The first electrode plate 11 may include a positive electrode collector made of an aluminum (Al) foil or material, and a positive electrode active material on the positive electrode collector. A chalcogenide compound may be used as the positive electrode active material, for example composite metal oxides, such as $LiCoO_2$, $LiMn_2O_4$, $LiNiO_2$, $LiNi_{1-x}Co_xO_2$ $(0<x<1)$, or $LiMnO_2$, but the material of the positive electrode active material is not limited thereto. In addition, the first electrode plate 11 may include a first electrode uncoated portion 11a where the first electrode active material is not applied.

The first electrode uncoated portion 11a may function as a passage for current flowing between the first electrode plate 11 and an exterior of the first electrode plate 11. The present invention is not limited to the material of the first electrode plate 11 listed herein, and can be any suitable material as appreciated by those skilled in the art.

The second electrode plate 12 may include a negative electrode collector formed of a thin conductive metal plate, for example made of a copper (Cu) or a nickel (Ni) foil or material, and a negative electrode active material on the negative electrode collector. The negative electrode active material may include, for example, a carbon (C) based material, Si, Sn, tin oxide, composite tin alloys, transition metal oxide, lithium metal nitride, or lithium metal oxide, but the material of the negative electrode active material is not limited thereto. In addition, the second electrode plate 12 may include a second electrode uncoated portion 12a where the negative electrode active material is not applied.

The second electrode uncoated portion 12a may function as a passage for current flowing between the second electrode plate 12 and an exterior of the second electrode plate 12. The present invention is not limited to the material of the second electrode plate 12 listed herein, and can be any suitable material as appreciated by those skilled in the art.

In other embodiments, polarities of the first and second electrode plates 11 and 12 may differ from what is described above. For example, in an embodiment, the first electrode plate 11 may be a negative electrode and the second electrode plate 12 may be a positive electrode.

The separator 13 may be positioned between the first electrode plate 11 and the second electrode plate 12 to prevent electrical short circuits and to allow movement of lithium ions. The separator 13 according to this embodiment may be made of a material selected from the group consisting of polyethylene, polypropylene, or a copolymer of polypropylene and polyethylene. The present invention is not limited to the material of the separator 13 listed herein, and can be any suitable material as appreciated by those skilled in the art. In an embodiment, the separator 13 has a greater width than either the first electrode plate 11 or the second electrode plate 12, and which may be advantageous in preventing a short circuit between the first electrode plate 11 and the second electrode plate 12.

A first collector plate 20 and a second collector plate 30, electrically connected to the first electrode plate 11 and the second electrode plate 12, respectively, are coupled to both ends of the electrode assembly 10, according to an embodiment.

The first collector plate 20 according to this embodiment may be made of a conductive metal, such as aluminum (Al), and may be coupled with the first electrode uncoated portion 11a protruding out from one end of the electrode assembly 10 and electrically connected to the first electrode plate 11.

Referring to the embodiments shown in FIGS. 2 and 4, the first collector plate 20 may include a first coupling part 23, a first bent part 22, a fuse part 25, and a first extension part 21.

The first coupling part 23 may include a plate connected to the first electrode uncoated portion 11a of the first electrode plate 11.

The first bent part 22 may be bent and extended from a top of the first coupling part 23 and coupled to a first end of the first extension part 21. The first bent part 22 may be configured such that the first end of the first extension part 21 and the top of the first coupling part 23 are perpendicular to each other about the first bent part 22 where the coupling part 23 is coupled to the first extension part 21.

The first extension part 21 may be positioned between a top portion of the electrode assembly 10 and a bottom portion of the cap assembly 50 and may be plate shaped. In addition, the first extension part 21 may include the fuse part 25.

In an embodiment, a second end of the first extension part 21 is coupled to a first electrode terminal 52. In this embodiment, the first extension part 21 may further include a terminal hole 24 passing through from an exterior surface to an interior surface of the first extension part 21. In this embodiment, the terminal hole 24 is configured to receive the first electrode terminal 52 inserted and coupled thereto.

In this embodiment, the fuse part 25 is at the first extension part 21. Specifically, the fuse part 25 according to this embodiment includes a fuse hole 27 at a region spaced a distance from the terminal hole 24 such that it does not to overlap with the first electrode terminal 52, and a fuse 26 having a smaller cross-sectional area than the first extension part 21 is accommodated in the fuse hole 27.

When over-charging occurs in the secondary battery 100, an inversion plate 62, described in greater detail below, may be inverted to cause a short circuit between the inversion plate 62 and a second connection plate 61. In these embodiments, a very large quantity of short-circuit current may flow, generating heat. The generated heat may be concentrated at the fuse 26 having a smaller cross-sectional area, and the fuse 26 may then be melted by the generated heat such that the fuse part 25 breaks and cuts off an electrical connection of the secondary battery 100.

The second collector plate 30 according to an embodiment is made of a conductive material such as nickel (Ni) or copper (Cu), and is coupled with the second electrode uncoated portion 12a protruding out from a second end of the electrode assembly 10 and electrically connected to the second electrode plate 12. The second collector plate 30 may include a second coupling part 33, a second bent part 32, and a second extension part 31.

The second collector plate 30 according to these embodiments is substantially the same as the first collector plate 20 shown in FIG. 4, thus repeated descriptions regarding configuration and function have been omitted. In this embodiment, the second collector plate 30 may include another fuse part corresponding to the fuse part 25 of the first collector plate 20.

The case 40 may be made of a conductive metal, such as aluminum, an aluminum alloy, or a nickel plated steel, and may have an approximately hexahedron shape having an opening through which the electrode assembly 10, the first collector plate 20, and the second collector plate 30 may be inserted and placed. The opening of the case 40 according to this embodiment corresponds to a substantially opened portion of an edge of the cap assembly 50. The inner surface of the case 40 according to this embodiment may be insulated from the electrode assembly 10, the cap assembly 50, the first and second collector plates 20 and 30, and the cap assembly 50. In this embodiment, the case 40 has a polarity, for example, the case 40 may be a positive electrode.

The cap assembly 50 is coupled to the case 40 according to an embodiment. In detail, the cap assembly 50 may include a cap plate 51, the first electrode terminal 52, a second electrode terminal 53, a gasket 54, and a nut 55. In addition, the cap assembly 50 may further include a plug 56, a vent plate 57, a first insulation member 58, a second insulation member 59, and a third insulation member 63.

The cap plate 51, according to these embodiments, is configured to close the opening of the case 40. The cap plate 51 may be made of the same material as that of the case 40. In embodiments, the cap plate 51 may have the same polarity as that of the case 40. However the material and the polarity of the cap plate 51 is not limited thereto.

The first electrode terminal 52, passing through one side of the cap plate 51, may be electrically connected or coupled to the first collector plate 20. The first electrode terminal 52 according to this embodiment may be shaped like a pillar having a threaded screw-shaped outer peripheral edge at its upper portion exposed to an upper portion of the cap plate 51, and a flange 52a at its lower portion located adjacent to a lower portion of the cap plate 51 to prevent the first electrode terminal 52 from being dislodged from the cap plate 51. A portion of the pillar of the first electrode terminal 52 located adjacent to a lower portion of the flange 52a may be fitted into the terminal hole 24 of the first collector plate 20, according to an embodiment. In this embodiment, the first electrode terminal 52 may be electrically connected or coupled to the cap plate 51.

The second electrode terminal 53, passing through a second side of the cap plate 51, may be electrically connected or coupled to the second collector plate 30. Since the second electrode terminal 53 has the same configuration as the first electrode terminal 52 according to this embodiment, repeated descriptions have been omitted. In this embodiment, the second electrode terminal 53 may be insulated from the cap plate 51.

The gasket 54, according to an embodiment, may be made of an insulating material and may be positioned between each of the first electrode terminal 52 and the second electrode terminal 53 and the cap plate 51 to seal the space between the respective electrode terminal 52 or 53 and the cap plate 51. The gasket 54 may prevent the introduction of external moisture into the secondary battery 100 or the leakage of electrolyte from the secondary battery 100.

The nut 55, according to an embodiment, is configured to engage the threaded screw-shaped outer peripheral edge on each of the first electrode terminal 52 and the second electrode terminal 53 to fix each respective electrode terminal 52 and 53 to the cap plate 51.

The plug 56, according to an embodiment, is configured to seal an electrolyte injection hole 51a of the cap plate 51. The vent plate 57, according to this embodiment, includes a notch 57a and is positioned within a vent hole 51b of the cap plate 51 and configured to open at a preset pressure.

The first insulation member 58 according to an embodiment is configured to be inserted between the first electrode terminal 52 and the cap plate 51, contacting the cap plate 51 and the gasket 54 through the nut 55. The first insulation member 58, according to this embodiment, insulates the first electrode terminal 52 from the cap plate 51 so as to prevent the first electrode terminal 52 and the cap plate 51 from being directly electrically connected to each other.

The second insulation member 59 according to an embodiment is configured to be inserted between the second electrode terminal 53 and the cap plate 51, contacting the cap plate 51 and the gasket 54. The second insulation member 59, according to this embodiment, insulates the second electrode terminal 53 from the cap plate 51.

The third insulation member 63 according to an embodiment is positioned between each respective first collector plate 20 and second collector plate 30 and the cap plate 51, and configured to prevent unnecessary short circuits from occurring therein.

The short-circuit unit 60 according to an embodiment is located in the cap plate 51. In detail, the short-circuit unit 60 may include a second connection plate 61 and the inversion plate 62.

The second connection plate 61 according to an embodiment may be configured to allow the second electrode terminal 53 to be inserted through to an exterior surface of the second connection plate 61 spaced apart from the cap plate 51. The second connection plate 61 according to this embodiment may extend above the second insulation member 59, and may extend over and cover the short-circuit hole 51c. The second connection plate 61 may be electrically connected or coupled to the second electrode terminal 53. When the internal pressure of the secondary battery 100 exceeds a preset pressure due to over-charging, the second connection plate 61, according to this embodiment, is configured to contact the upwardly convexly protruding inversion plate 62, thereby causing a short circuit. Once the short circuit has been triggered by the second connection plate 61 according to this embodiment, a large quantity of current may flow and generate heat. In this embodiment, the fuse part 25 functions as a fuse, thereby improving the safety of the secondary battery 100.

Referring to FIG. 3A, the inversion plate 62 is disposed between the second insulation member 59 and the cap plate 51 in the short-circuit hole 51c of the cap plate 51. The inversion plate 62 includes a convex round part 62a, and a flange part 62b fixed to the cap plate 51. The inversion plate 62 may have the same polarity as that of the cap plate 51.

Referring to the embodiment shown in FIG. 3B, the inversion plate 62 in this embodiment is inverted to upwardly convexly protrude when the internal pressure of the secondary battery 100 exceeds a preset pressure due to over-charging, as described above.

In this embodiment, since a contact area between the inversion plate 62 and the second connection plate 61 is limited, the contact resistance may concentrate on a contact region P. Thus, in this example, the inversion plate 62 and the second connection plate 61 must first be melted before the fuse part 25 can operate, such that a short-circuited state cannot be sustained. However, according to embodiments of the present invention, since some of the short-circuit current induced into the contact region P between the inversion plate 62 and the second connection plate 61 can be removed through the capacitive member 72, described in further detail below, it may be possible to prevent the contact region P between the inversion plate 62 and the second connection plate 61 from melting, thereby allowing the fuse part 25 to operate in a secured manner.

Next, referring to the embodiments shown in FIGS. 5A and 5B, the first connection plate 71 may be configured to allow the first electrode terminal 52 to be inserted through to an exterior surface of the first connection plate 71 spaced apart from the cap plate 51, above the first insulation member 58, and the position of the first connection plate 71 may be fixed by the nut 55. One end of the first connection plate 71 may be electrically connected or coupled to the second electrode terminal 53 and the other end of the first connection plate 71 may be electrically connected or connected to the cap plate 51 through the capacitive member 72 described in further detail below.

The capacitive member 72 according to an embodiment is positioned between the first connection plate 71 and the cap plate 51. The capacitive member 72 according to this embodiment includes a rechargeable/dischargeable device and is located on the cap plate 51 in a discharged state.

The capacitive member 72 may include a low-capacity electrode assembly having a first electrode plate 73, a second electrode plate 74, and a separator 75, similar to the electrode assembly 10 including the first electrode plate 11, the second electrode plate 12, and the separator 13, and a low-capacity case 76 accommodating the low-capacity electrode assembly. In this embodiment, the first electrode plate 73, the second electrode plate 74, and the separator 75 are substantially the same as the first electrode plate 11, the second electrode plate 12, and the separator 13, respectively, described above.

In this embodiment, the first electrode plate 73 may be coupled to the first connection plate 71 and electrically connected to the first electrode plate 11, and the second electrode plate 74 may be connected to the cap plate 51.

In addition, the capacitive member 72 may be positioned such that the second electrode plate 74, the separator 75, and the first electrode plate 73 are sequentially stacked on the cap plate 51. In this embodiment, the second electrode plate 74, the separator 75, and the first electrode plate 73 are preferably stacked one on the other, thereby minimizing the size of the capacitive member 72.

In an embodiment, as described above, when the internal pressure of the secondary battery 100 exceeds a preset pressure due to over-charging, the second connection plate 61 contacts the upwardly convexly protruding inversion plate 62 causing a short circuit. A short-circuit current (I) flows from the first collector plate 20 to the second collector plate 30 through the cap plate 51, and the capacitive member 72 may be charged by the short-circuit current (I).

Therefore, since some of the short-circuit current (I) induced into the contact region P between the inversion plate 62 and the second connection plate 61 is consumed by the capacitive member 72, according to embodiments described above, the short-circuit current (I) induced into the contact region P between the inversion plate 62 and the second connection plate 61 may be reduced, thereby preventing the contact region P from melting and allowing the fuse part 25 to operate in a secured manner.

In this embodiment, the capacitive member 72 is continuously charged until the fuse 26 of the fuse part 25 is melted to interrupt the flow of the short-circuit current (I), and some of the short-circuit current (1) may be continuously consumed. Therefore, it is possible to prevent the contact region P between the inversion plate 62 and the second connection plate 61 from melting while the fuse part 25 operates.

Although exemplary embodiments of the present invention have been described in detail above, it should be understood that many variations and modifications of the basic inventive concept herein described, which may appear to those skilled in the art, will still fall within the spirit and scope of the e present invention.

What is claimed is:
1. A secondary battery comprising:
  an electrode assembly;
  a case accommodating the electrode assembly;
  a cap assembly comprising a cap plate having a short-circuit hole and configured to seal the case;
  a first connection plate at an exterior surface of the case and coupled to the electrode assembly;

a capacitive member between the first connection plate and the cap plate, the capacitive member comprising a rechargeable device; and a short-circuit unit comprising an inversion plate positioned in the short-circuit hole and a second connection plate at an exterior surface of the case spaced apart from the cap plate and extending over at least a portion of the short-circuit hole, the second connection plate being coupled to the electrode assembly.

2. The secondary battery of claim 1, wherein the first connection plate and the cap plate are insulated from the second connection plate.

3. The secondary battery of claim 2, wherein when an internal pressure of the case exceeds a preset pressure, the inversion plate is configured to deform and contact the second connection plate.

4. The secondary battery of claim 3, wherein the inversion plate comprises:
 a round convex portion adjacent to the electrode assembly; and
 a flange coupled to the cap plate.

5. The secondary battery of claim 3, further comprising:
 a first electrode terminal coupled to the electrode assembly and exposed to an exterior of the cap plate; and
 a second electrode terminal coupled to the electrode assembly and exposed to the exterior of the cap plate.

6. The secondary battery of claim 5, further comprising:
 a first collector plate configured to couple the electrode assembly to the first electrode terminal; and
 a second collector plate configured to couple the electrode assembly to the second electrode terminal.

7. The secondary battery of claim 6, wherein the first collector plate comprises a coupling part coupled to a first side of the electrode assembly, a bent part extending from a top of the coupling part, and an extension part extending from the bent part and coupled to the first electrode terminal.

8. The secondary battery of claim 7, wherein the first collector plate further comprises a fuse part on the extension part, the fuse part comprising a fuse hole and a fuse positioned in the fuse hole, the fuse having a smaller cross-sectional area than the extension part.

9. The secondary battery of claim 1, wherein the capacitive member comprises a low-capacity electrode assembly comprising a first electrode plate, a second electrode plate, and a separator between the first electrode plate and the second electrode plate, and a low-capacity case accommodating the low-capacity electrode assembly.

10. The secondary battery of claim 9, wherein the first electrode plate, the separator, and the second electrode plate of the low capacity electrode assembly are sequentially stacked.

11. The secondary battery of claim 9, wherein the first electrode plate of the low-capacity electrode assembly is coupled to the first connection plate, and the second electrode plate of the low-capacity electrode assembly is coupled to the cap plate.

12. The secondary battery of claim 11, wherein the low-capacity electrode assembly is in a discharged state.

13. The secondary battery of claim 9, wherein the low-capacity electrode assembly is recharged by current generated when the inversion plate contacts the second connection plate.

14. The secondary battery of claim 13, wherein after the inversion plate contacts the second connection plate, the low-capacity electrode assembly is configured to recharge until the fuse of the fuse portion melts.

* * * * *